(12) United States Patent
Larisch

(10) Patent No.: US 8,832,934 B2
(45) Date of Patent: Sep. 16, 2014

(54) METHOD FOR FITTING OF A PLUG HOUSING

(75) Inventor: Markus Larisch, Dorsten (DE)

(73) Assignee: Delphi Technologies, Inc., Troy, MI (US)

(*) Notice: Subject to any disclaimer, the term of this patent is extended or adjusted under 35 U.S.C. 154(b) by 393 days.

(21) Appl. No.: 13/305,096

(22) Filed: Nov. 28, 2011

(65) Prior Publication Data

US 2012/0304439 A1 Dec. 6, 2012

(30) Foreign Application Priority Data

Dec. 1, 2010 (EP) .................................... 10015198

(51) Int. Cl.
*H01R 9/00* (2006.01)
*B25J 9/16* (2006.01)
*G01B 11/00* (2006.01)
*H01R 43/20* (2006.01)

(52) U.S. Cl.
CPC ............. *H01R 43/20* (2013.01); *B25J 9/162* (2013.01); *G05B 2219/40298* (2013.01); *G01B 11/002* (2013.01); *B25J 9/1687* (2013.01); *G05B 2219/40033* (2013.01)
USPC ................ 29/842; 29/564; 29/564.1; 29/876

(58) Field of Classification Search
USPC ........................................ 29/564, 564.1, 842
See application file for complete search history.

(56) References Cited

U.S. PATENT DOCUMENTS

| 4,721,384 | A | * | 1/1988 | Dietrich et al. | ............... 356/3.03 |
| 6,043,877 | A | | 3/2000 | Land | |
| 2004/0188642 | A1 | | 9/2004 | Kodama et al. | |
| 2004/0266276 | A1 | | 12/2004 | Hariki et al. | |

FOREIGN PATENT DOCUMENTS

| DE | 102007027877 | 12/2008 |
| JP | 5062752 | 12/1993 |
| JP | 5062757 | 12/1993 |
| JP | 9014919 | 1/1997 |

OTHER PUBLICATIONS

European Search Report, dated Aug. 16, 2011.

* cited by examiner

*Primary Examiner* — Carl Arbes
(74) *Attorney, Agent, or Firm* — Robert J. Myers

(57) ABSTRACT

A method to fit a contact portion in a plug housing by a robot is presented. Steps in the method include attaching a plug housing to a holder and gripping the contact portion by a gripping device of the robot. Other steps in the method include taking at least one spatially resolved picture by at least one optical detection device such that the plug housing and the contact portion are contained in the picture, determining a respective position of the plug housing and the contact portion in the picture by a control unit of the moveable robot, calculating a robot movement by the control unit that is a function of the determined positions, and performing the calculated movement by the robot to fit the contact portion in the plug housing. An apparatus to perform the method and another method to calibrate the control unit of the robot are also presented.

8 Claims, 8 Drawing Sheets

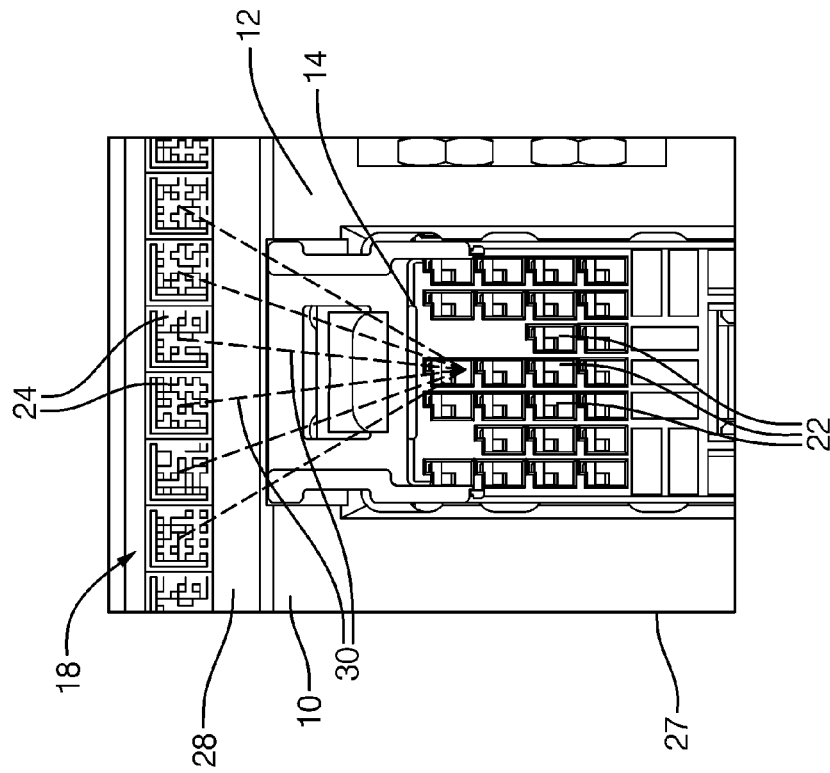
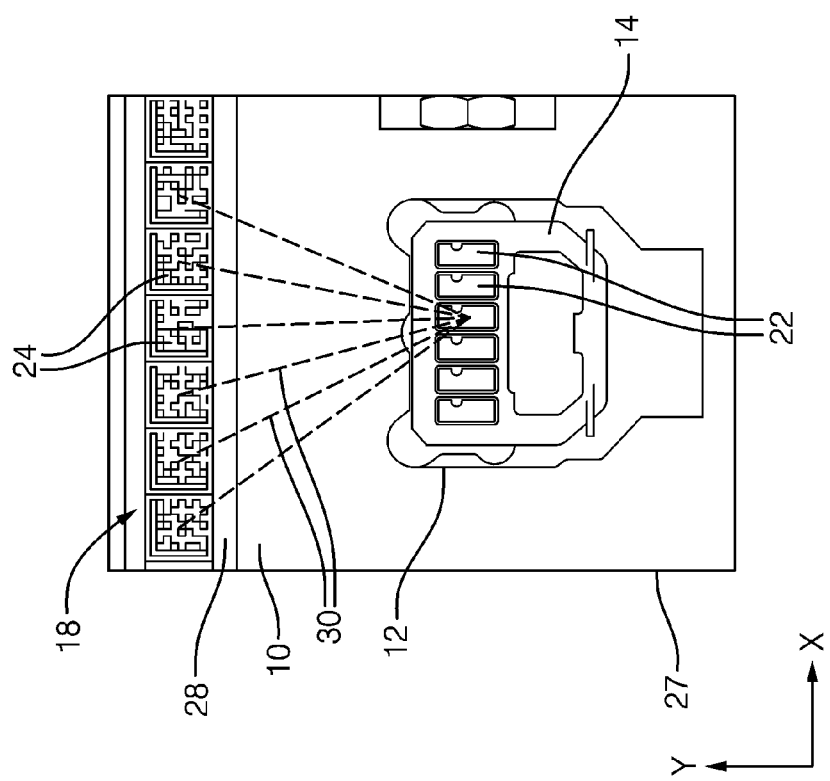
FIG. 3 A
FIG. 3 B

METHOD FOR FITTING OF A PLUG HOUSING

RELATED DOCUMENTS

This application claims priority to European application EP 10015198.4 filed on 1 Dec. 2010.

TECHNICAL FIELD

This invention relates to a method and an apparatus for the fitting of a plug housing with a contact portion mounted on an electrical cable by a movable robot as well as a method for the calibration of a control unit of a movable robot.

BACKGROUND OF INVENTION

It is known to have a plug housing fixed to a holder, and an electrical cable with a contact portion gripped by a robot, and a spatially resolved picture of the plug housing taken by an optical detection device. By evaluation of the picture of the plug housing, it may be detected when the plug housing is accidentally mounted with a tilt or offset from its desired standard position in the holder so that a correction of a relative position of the plug housing in relation to the robot may be made.

In particular, if robots, plug housings, holders, and contact portions are used, which are respectively subject to manufacture-related mechanical tolerances, a precise, error-free fitting of the contact portion to the plug housing may not always be guaranteed.

Thus, a method and an apparatus for the fitting of a contact portion mounted to an electrical cable to a plug housing by a movable robot, in which the robot, plug housings, holders and/or contact portions are subject to manufacturing and part tolerances, allow precise, error-free, and rapid fitting of the contact portion mounted on an electrical cable to the plug housing.

SUMMARY OF THE INVENTION

In accordance with one embodiment of the invention, a method to fit a contact portion disposed on an electrical cable to a plug housing by a moveable robot is presented. One step in the method includes fixedly attaching at least one holder to the plug housing. Another step in the method includes gripping at least one of the electrical cable and the contact portion by a gripping device of the robot. A further step in the method is taking at least one spatially resolved picture by at least one optical detection device such that the plug housing and the contact portion are contained in said at least one spatially resolved picture. Another step in the method is determining a position of the plug housing and a position of the contact portion in said spatially resolved picture by a control unit of the moveable robot. A further step in the method is calculating a robot movement by the control unit that fits the contact portion to the plug housing that is a function of said respective determined positions. Another step in the method is performing, by said robot, said calculated movement to fit the contact portion in to the plug housing.

According to the invention, at least one spatially resolved picture is taken both of the plug housing fixed to the holder and of the contact portion held by the gripping device. In this case one and the same spatially resolved picture taken may include both the plug housing and the contact portion, or the plug housing and the contact portion may be contained in different spatially resolved pictures taken. Taking the spatially resolved pictures constitutes an optical measurement of the region which is displayed in each case and which includes the plug housing and/or the contact portion. By taking a picture both of the plug housing fixed in the holder and of the contact portion gripped by the gripping device or connected to the cable gripped by the gripping device, an actual relative position between the plug housing and the contact portion can be determined independently of mechanical tolerances of the gripping device of the robot, the holder, the plug housing or the contact portion, as a result of which in all cases precise and error-free fitting of the plug housing with the contact portion is made possible.

The fact that a spatially resolved picture contains a certain part such as e.g. the plug housing or the contact portion basically means within the scope of the invention not only that the respective part is contained in the picture in its entirety, but it may be only a detail of the part that is displayed in the picture. For instance, the at least one spatially resolved picture may contain only a detail of the plug housing which contains for example a plug cavity of the plug housing designed to receive the contact portion and referred to for determining the position of the plug housing. In that case only a detail of the plug housing which is large enough for the respective plug cavity or some other predefined reference point of the plug housing to be capable of being identified in the picture, must be visible in the picture.

According to an advantageous embodiment of the invention, a first spatially resolved picture which contains the plug housing is taken, and a second spatially resolved picture which contains the contact portion and which is different from the first spatially resolved picture. To calculate the necessary robot movement, the position of the plug housing in the first picture and the position of the contact portion in the second picture can then be used. The first and/or the second picture in this case may basically also contain both the plug housing and the contact portion.

Preferably, the first spatially resolved picture is taken from a front side of the plug housing from which the contact portion is inserted in the plug housing, and the second spatially resolved picture which contains the contact portion is taken from a rear side of the plug housing. In this way, when taking the first and second pictures, in each case favourable angles of vision of the plug housing and the contact portion are ensured, which facilitate subsequent picture processing. The first and the second spatially resolved pictures can be taken by one and the same optical detection device or by different optical detection devices which can be mounted in particular independently of each other. If the two pictures are taken with the same optical detection device, a movable optical detection device which changes between different locations between taking the first and second pictures can be used.

In another embodiment of the invention, the first spatially resolved picture contains the holder, wherein a position of the plug housing relative to the holder in the first spatially resolved picture is determined, and/or that the second spatially resolved picture contains the holder, wherein a position of the contact portion relative to the holder in the second spatially resolved picture is determined. By using the holder as a common reference object, the relative position of the plug housing to the contact portion can be determined precisely, even if the picture containing the plug housing and the picture containing the contact portion are taken from different standpoints of an optical detection device.

To take a spatially resolved picture which is easy to evaluate and which contains the contact portion and the holder, the contact portion can be moved by the robot into the vicinity of the holder before the spatially resolved picture is taken. This can be done in such a way that the contact portion is located at approximately the same distance from the optical detection device as the holder.

A spatially resolved picture taken by the optical detection device contains information on the position of the objects contained in the picture in each case, e.g. the plug housing and the contact portion, with respect to a position and orientation in space of the optical detection device taking the respective spatially resolved picture, i.e. it can be seen from the picture where the object displayed is located with respect to an image plane of the optical detection device which runs perpendicularly to an optical axis of the optical detection device.

Preferably, the positions of the plug housing and contact portion in the respective picture which are determined from the at least one spatially resolved picture and which, as described above, are defined with respect to a reference system of the optical detection device detecting the respective picture, are converted to corresponding positions in a reference system of the robot, so that the robot can correctly approach the actual position of the plug housing. For this purpose it is preferably provided that at least one spatially resolved picture taken contains the gripping device of the robot, and a position of the gripping device in the at least one spatially resolved picture is determined. The position of the gripping device in relation to the optical detection device taking the picture, which is determined in this way, is compared with the internal coordinates of the gripping device determined in a control unit of the robot, and from these is determined a coordinate transformation with which positions e.g. of the plug housing and contact portion determined with respect to the optical detection device can be converted to the reference system of the control unit of the robot. Basically, a part of the robot other than the gripping device can also be displayed and picture-processed by the optical detection device as described above, in order to determine the position of the robot. According to an advantageous embodiment, the position of the gripping device in at least one spatially resolved picture relative to the holder contained in the same picture is determined.

The holder can in each case include one or more reference features on a front and/or rear side. According to an advantageous embodiment, it is then provided that a position of the plug housing relative to at least one reference feature of the holder contained in the first spatially resolved picture is determined, and/or that a position of the contact portion relative to at least one reference feature of the holder contained in the second spatially resolved picture is determined. The use of such reference features makes it easier to determine the position of the contact portion or plug housing relative to the holder, particularly when the respective spatially resolved picture contains only a detail of the holder. Basically, several reference features of the holder can be designed substantially the same. But preferably, several reference features of the holder are distinguishable from each other and constitute for example coding systems, wherein in one embodiment by way of example a reference feature in a spatially resolved picture containing the reference feature is uniquely identified with the aid of its coding system.

With an optical detection device, two-dimensional pictures of the respectively displayed spatial region can be taken. According to an advantageous embodiment of the method, from the two-dimensional positions of the contact portion, the holder and/or the robot in the at least one spatially resolved picture, in each case a position and orientation of the respective part in space are calculated, i.e. in three dimensions. For this purpose, first the two-dimensional positions of two, three or more reference points of the respective part in the respective spatially resolved picture can be determined. With knowledge of the spatial dimensions of the respective part and hence the actual relative positions of the reference points to each other in space, which for example can be filed in a control unit beforehand, from these can be calculated for each part its position and/or its orientation in space. These three-dimensional positions and/or orientations can then be used to calculate the robot movement necessary for assembly.

According to an advantageous embodiment, it is provided that the position of the plug housing relative to several reference features of the holder contained in a first spatially resolved picture which contains the plug housing and the holder as described above, is determined, and/or that the position of the contact portion relative to several reference features of the holder contained in a second spatially resolved picture which contains the contact portion and the holder as described above, is determined. This plurality of relative positions determined in the first or second picture can be used to calculate the position and/or the orientation of the plug housing or contact portion relative to the holder in three dimensions.

According to a further embodiment, a curvature of the electrical cable in the spatially resolved picture containing the contact portion is determined, and from this is calculated a deflection of the contact portion relative to the gripping device.

According to an advantageous embodiment, a holder which comprises several holding devices for fixing several plug housings is used. In that case, first the positions of the plug housings can be determined, and then all of the plug housings can be fitted with contact portions. To determine the positions of the plug housings, preferably several spatially resolved pictures which contain different plug housings can be taken, wherein to take the plurality of pictures the holder is moved stepwise by means of a drive past an optical detection device which in each case takes a spatially resolved picture of the section of the holder located in front of the detection device. The different sections taken can in this case be distinguished with the aid of distinguishable reference features arranged in the respective sections of the holder, and the pictures taken can thus be assigned to the respective holder sections.

Basically, different types of plug housings which can contain for example different numbers and/or different arrangements of plug cavities can be fitted by the method according to the invention. Preferably, the type of plug housing fixed to a given holder is determined independently of the optical picture recording and picture processing carried out to determine the position of the plug housing, and imparted to a control system of the robot, whereupon, depending on the type determined, automatic fitting of the plug cavities of the respective plug housing with contact portions is carried out.

According to an advantageous embodiment, an optical detection device with an entrocentric lens is used to take the at least one spatially resolved picture. Optical distortions of a lens used can be determined and corrected during subsequent picture processing, by taking a picture of a previously specified reference pattern, in particular a regular reference pattern such as e.g. a chessboard pattern, with the detection device, and calculating the distortions contained in the picture.

If a holder with reference features provided on two sides of the holder is used, preferably calibration of the holder is carried out before performing the assembly operation. For this purpose, first a spatially resolved picture is taken from both sides of the holder, wherein each picture contains one or more reference features arranged on the respective side of the holder as well as a marking of the holder which is visible from both sides of the holder. Then the positions of the reference features relative to the markings are determined. For this purpose, further spatially resolved pictures containing the reference features can be taken from both sides of the holder, for which in particular the holder can be moved stepwise past an optical detection device. In the manner described above, the relative positions of the reference features present on both sides of the holder can be calculated and then taken into consideration when calculating the positions. For example, a correction table with correction values can in this case be compiled, which indicates a misalignment between reference features provided on either side of the holder.

An apparatus according to an alternate embodiment of the invention may carry out the method previously described herein. The advantageous embodiments and advantages described above in relation to the method apply to the apparatus accordingly.

According to an advantageous embodiment of the apparatus, the holder has several reference features. The holder can in this case have, both on a front side and on a rear side, one or more reference features which are visible only from the respective front or rear side of the holder, and/or one or more markings which are visible from both sides of the holder.

According to an advantageous embodiment, at least one of the reference features is designed as a data matrix code. Such a data matrix code can be applied in particular to a plastic film of the holder. Preferably several data matrix codes are different to each other, so that each reference feature is uniquely identifiable with the aid of the data matrix codes.

According to another alternate embodiment of the invention, a method for the calibration of a control unit of a movable robot is presented.

The internal coordinates of the robot in the reference position which are stored in the control unit indicate how the robot is positioned and oriented in space in relation to the optical detection device. This information can be used by the control unit to convert positions determined by means of the optical detection device to the reference system of the robot, and so allow the robot to be controlled reliably in such a way that it approaches a predetermined position of an object reliably. The coordinates can include both coordinates of a position and of an orientation of the part of the robot in space.

According to yet another advantageous embodiment of the invention, the steps in the method to calibrate the control unit of the moveable robot as previously described above is performed at least once with a reference object mounted on a flange of the robot and at least once with one on a gripping device of the robot mounted on the flange of the robot. By the above-mentioned method, the position and orientation of a gripper relative to a position and orientation of the robot flange can be determined in three-dimensional coordinates, although a spatially resolved picture contains only an image in two coordinates. This information can subsequently be used by the control unit to approach a predetermined position with the gripping device exactly. In this case, the same reference object can be used in particular for the flange of the robot and for the gripping device. In this case an imprecise shape of the reference object has no effect on the precision of measurement, because in both steps essentially the same measurement errors are made, and these are therefore compensated when determining the relative position of robot flange and gripping device.

The reference object can be attached to a holding device of a robot flange which serves to attach a gripping device of the robot. In particular a calibration table with a chessboard pattern can be used as the reference object. The calibration table can comprise four reference marks arranged in a rectangle and/or a vertically projecting pin which in particular can be arranged at the center of the table and which can contain a marking point in the middle. The reference position of the reference object can in this case be defined in such a way that it is reached when, in the picture taken, the marking point is located at the center of a rectangle consisting of the four reference marks and so the table is perpendicular to the optical detection device. From the size of the reference object in the picture taken, the distance from the robot to the optical detection device can then be determined.

The calibration method as previously described herein may be used in combination with the assembly method to fit the contact portion to the plug housing as previously described herein.

Further features, uses and advantages of the invention will appear more clearly on a reading of the following detailed description of the embodiments of the invention, which is given by way of non-limiting example only and with reference to the accompanying drawings.

BRIEF DESCRIPTION OF THE DRAWINGS

This invention will be further described with reference to the accompanying drawings in which:

FIGS. 3A and 3B are two spatially resolved pictures taken with the apparatus of FIG. 1, and the pictures contain a plug housing;

DETAILED DESCRIPTION

Figure 1:
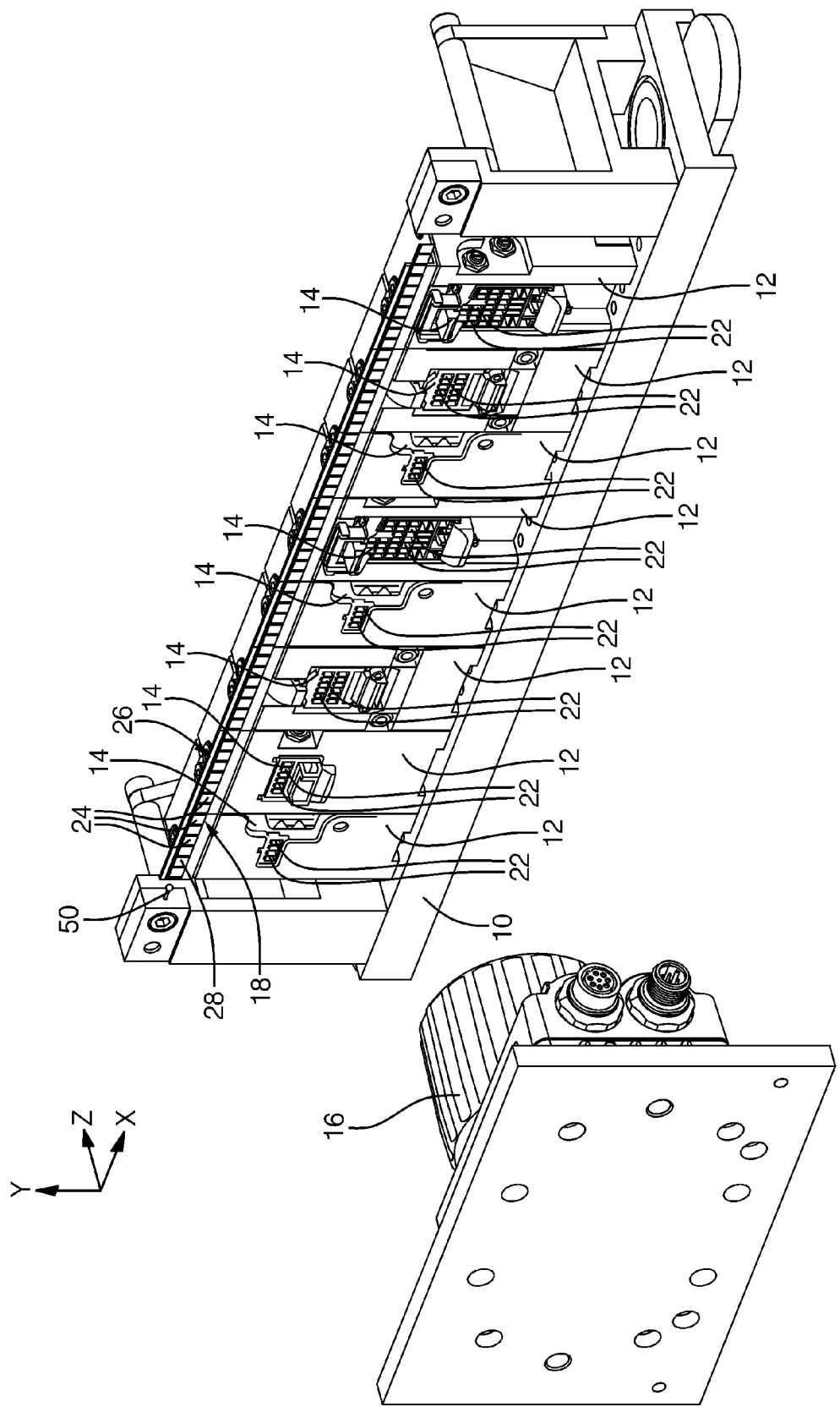
FIG. 1 is a perspective view of an assembly apparatus that includes an optical detection device in accordance to an embodiment of the invention.
Figure 4:
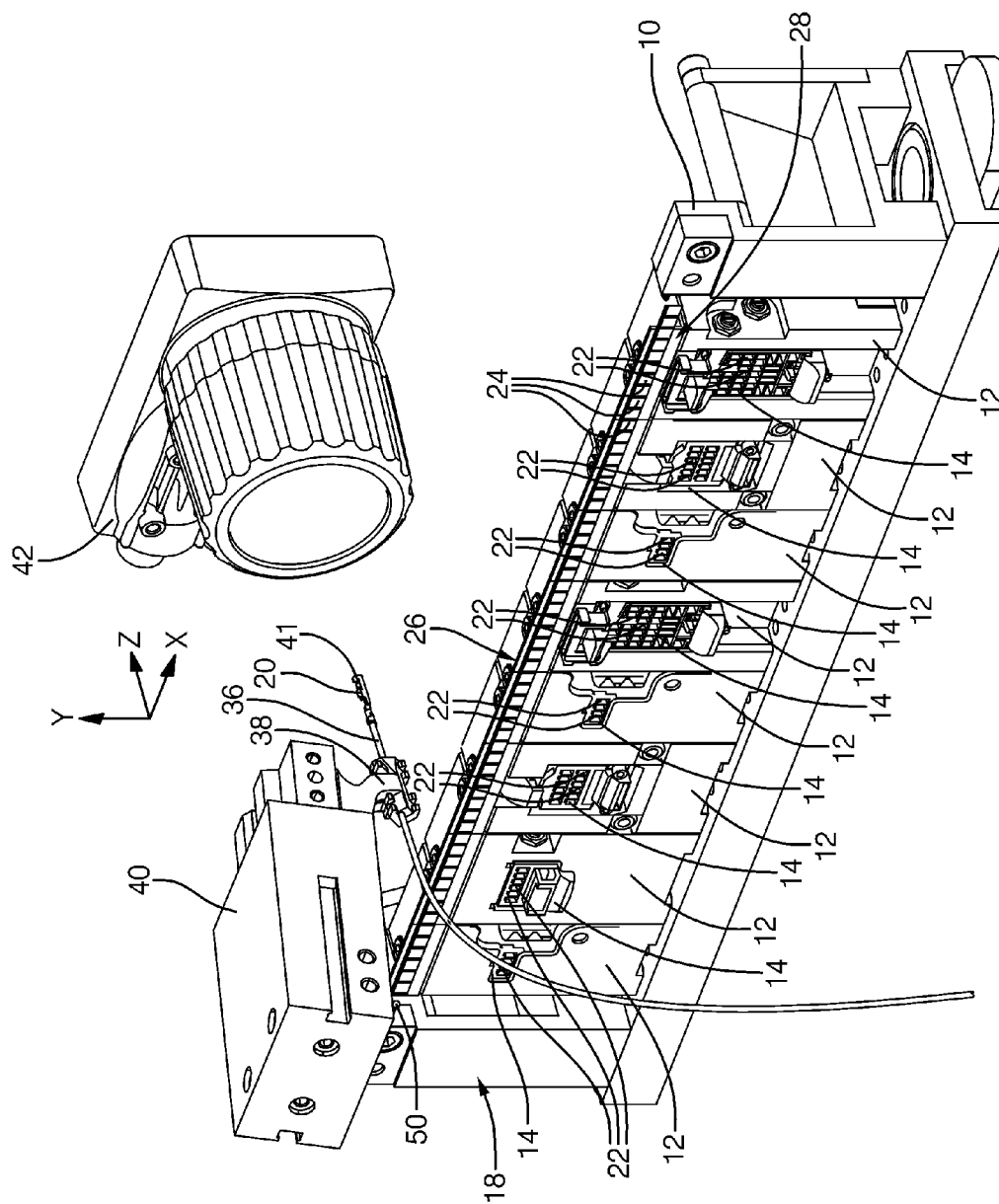
FIG. 4 is a further perspective view of the apparatus of FIG. 1.

In accordance with a one embodiment of this invention, referring to FIG. 1, shows a perspective view of an assembly apparatus according to an embodiment of the invention. The apparatus includes a holder 10 with several holding devices 12 in each of which a plug housing 14 is fixed by latching. The holding devices 12 of the holder 10 are arranged succeeding each other in a longitudinal direction x of the holder 10, and releasably connected to a base section of the holder 10. A first optical detection device 16 is directed onto a rear side 26 of the holder 10, from which a contact portion 20, as best illustrated in FIG. 4, is inserted in a plug cavity 22 of a plug housing 14. Device 16 is configured to take a spatially resolved picture which contains holder 10 and plug housing 14.

The holder 10 comprises several reference features 24 which are designed as data matrix codes and which are arranged on a support 28 at regular intervals succeeding each other in the longitudinal direction x of the holder 10, and form with the support 28 a straight edge. In the present example, on both the rear side 26 and the front side 18 of the holder 10 are arranged reference features 24 which in each case are visible only from the front or rear side 18, 26. But basically, reference features could also be visible from both sides 18, 26 and for this purpose be applied for example to a transparent support material.

Figure 2:
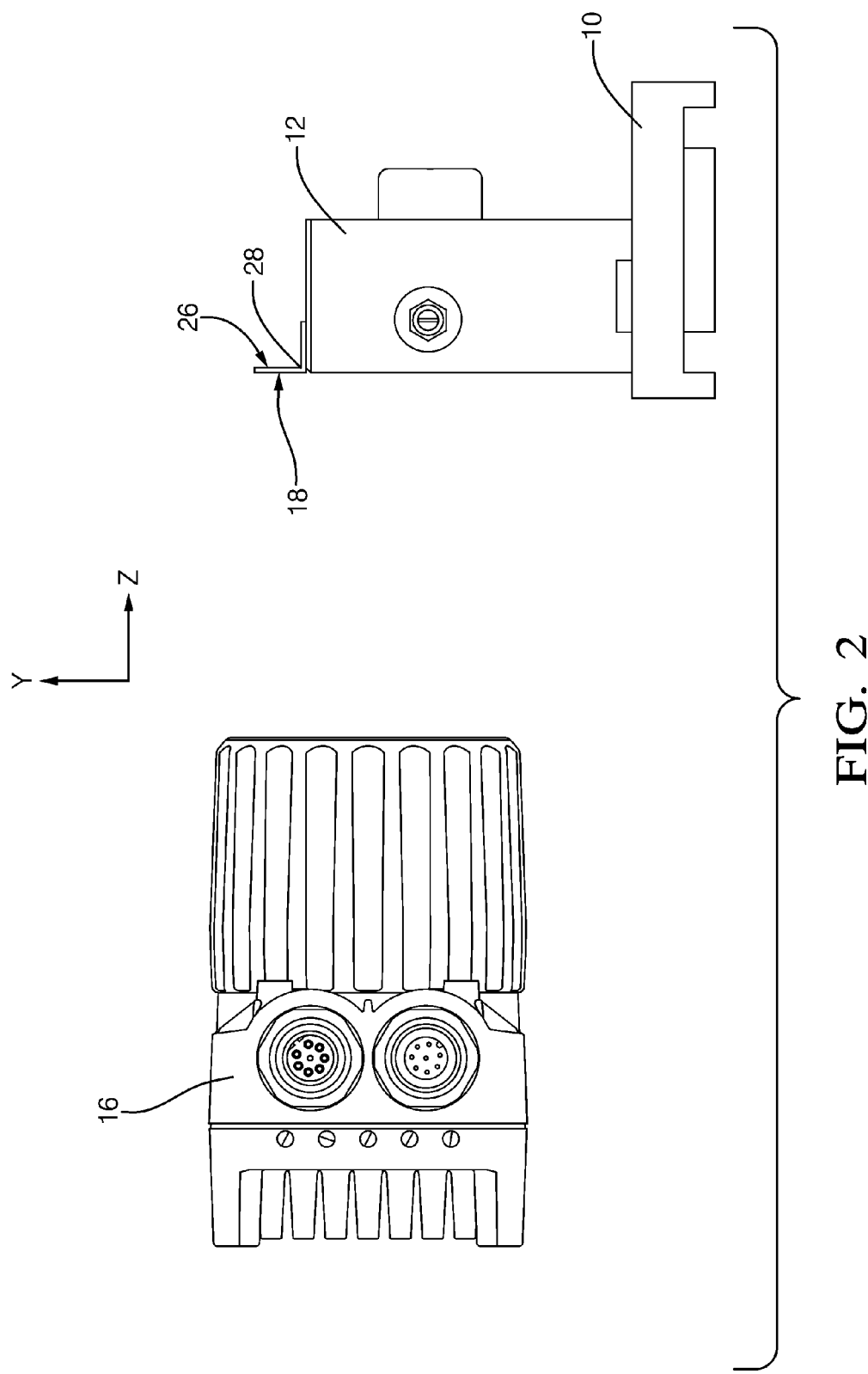
FIG. 2 is a side view of the apparatus of FIG. 1.

As can be seen from the side view in FIG. 2, the optical detection device 16 and the holder 10 are arranged in such a way that the optical axis of the optical detection device 16 and the direction of insertion z in which a contact portion 20 can be inserted in a plug housing 14, are substantially parallel. In the present example, the holder 10 is displaced by a suitable drive in its longitudinal direction x and moved past the optical detection device 16, for taking the pictures containing the different plug housings 14.

FIGS. 3a and 3b show spatially resolved pictures 27 taken with the optical detection device 16 by way of example. As shown by arrows 30 in FIGS. 3a and b, from the spatially resolved pictures of the optical detection device 16 is determined in each case the position of a given plug cavity 22 of the plug housing 14 displayed, relative to several reference features 24 of the holder 10. The reference features 24 can in this case be identified by evaluation of the corresponding data matrix codes by picture processing of the spatially resolved picture, and assigned to the respectively displayed plug housing 14.

By picture processing, furthermore a type of plug housing 14 displayed in a spatially resolved picture 27 is detected, wherein automatic fitting of all plug cavities 22 of the plug housing 14 is carried out during subsequent assembly as a function of the type detected and with the aid of stored arrangements of the plug cavities 22 for the respective type.

Figure 5:
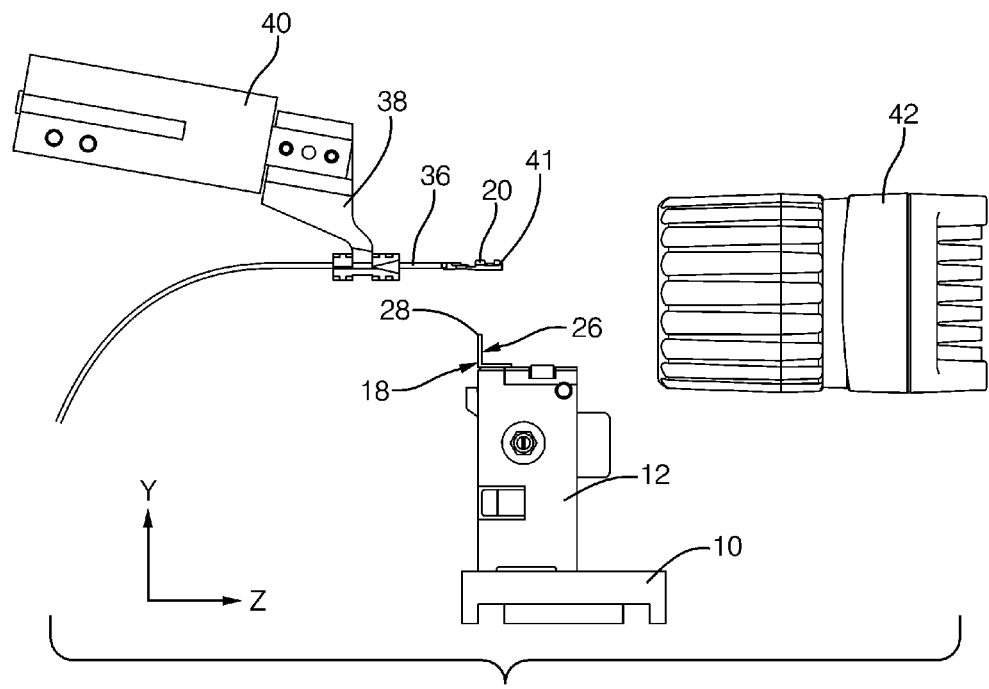
FIG. 5 a side view of the apparatus of FIG. 4.
Figure 6:
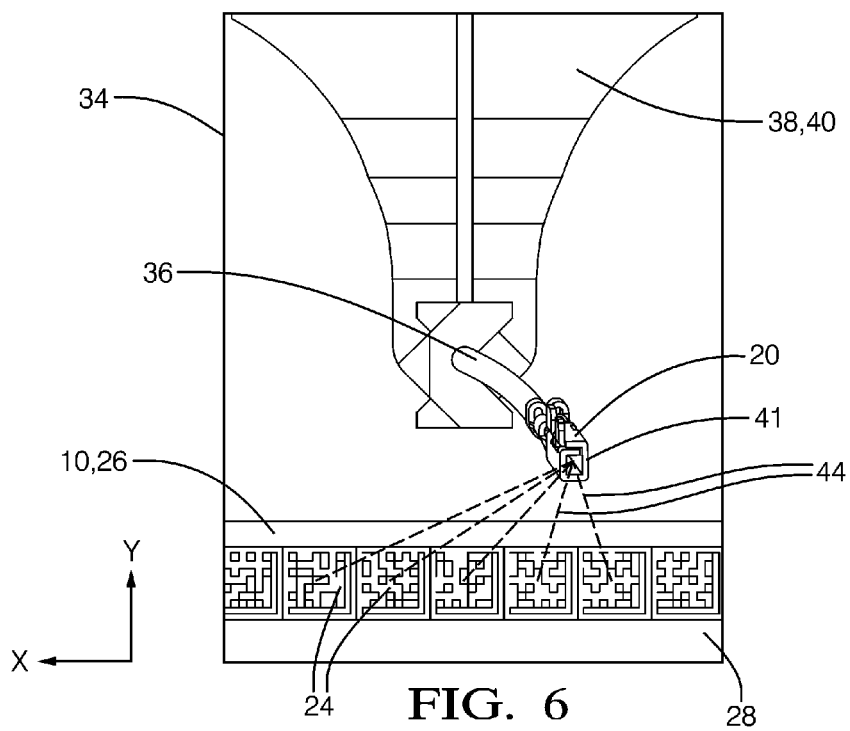
FIG. 6 a spatially resolved picture taken with the optical detection device of FIG. 1, and containing a contact portion therein.

Referring to FIG. 4, the apparatus of FIGS. 1 and 2 during the taking of a further spatially resolved picture 34, shown by way of example in FIG. 6, by a second optical detection device 42 which is directed onto the front side 18 of the holder 10. Only one holding device 12 of the holder 10 is illustrated in FIG. 4. An electrical cable 36 with a contact portion 20 mounted on the electrical cable 36 is gripped by a gripping device 38 of the robot 40 and moved into the vicinity of the holder 10 in such a way that an end face 41 of the contact portion 20 and the holder 10 are, as illustrated in FIG. 5, approximately the same distance away from the optical detection device.

Referring to FIG. 6, spatially resolved picture 34 taken with the optical detection device 42 contains the contact portion 20 and several reference features 24 of the holder 10. As illustrated by arrows 44 in FIG. 6, the relative position of the contact portion 20 relative to the plurality of reference features 24 in the spatially resolved picture 34 is determined. Also, a curvature of the electrical cable 36 in the spatially resolved picture 34 is determined, and from this a deflection of the contact portion 20 relative to the gripping device 38 is determined.

The apparatus is designed to take a picture as shown in FIGS. 3a and b for each plug housing 14, and then to take a picture as shown in FIG. 6 for each electrical cable 36, and, with the aid of the established positions of the plug housings 14 and the respective contact portion 20, to fit the plug cavities 22 of the plug housings 14 with contact portions 20 in order.

The apparatus is not in use when holding devices 12 are not fixedly attached to holder 10 and/or plug housings 14 are not attached to holding devices 12. The apparatus is also not in use if gripping device 38 of moveable robot 40 of apparatus does not grip at least one of electrical cable 36 or a contact portion 20 attached to electrical cable 36.

Figure 7:
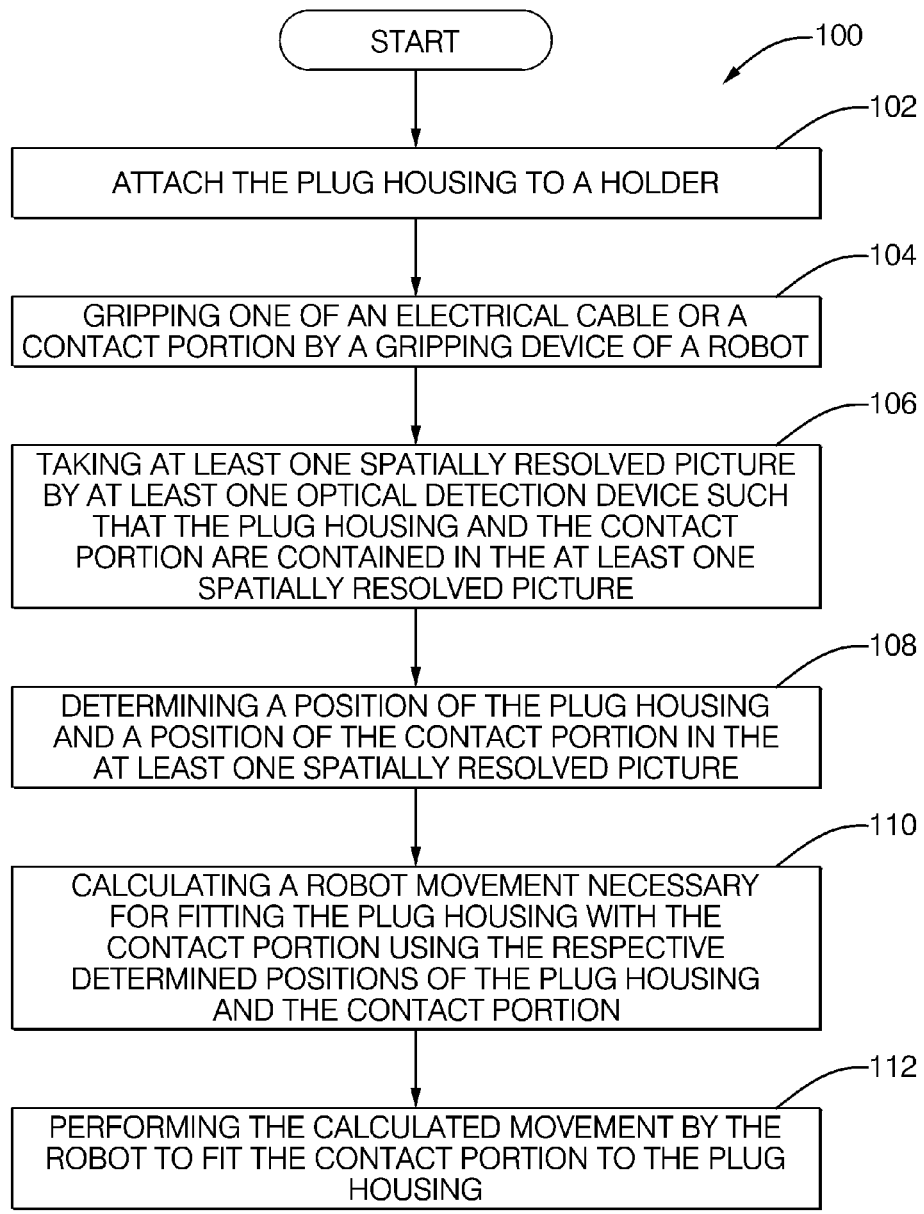
FIG. 7 is a method flowchart to fit a contact portion disposed on an electrical cable to a plug housing the apparatus of FIG. 1.

The apparatus is in use when holder devices 12 are arranged in holder 10 and plug housings 14 are attached to holding devices 12. Gripping device 38 of moveable robot 40 of the apparatus grips at least one of electrical cable 36 or a contact portion 20 attached to electrical cable 36. Referring to FIG. 7, the apparatus fits contact portion 20 into plug housing 14 by steps 102, 104, 106, 108, 110, 112 of method 100. One step of 102 of method 100 includes attaching at least one holder 12 to plug housing 14. Another step 104 of method 100 includes gripping one of electrical cable 36 and contact portion 20 by a gripping device 38 of robot 40. A further step 106 of method 100 is taking of at least one spatially resolved picture 27 by at least one optical detection device 16 such that contact portion 20 and plug housing 14 are contained in the taken at least one spatially resolved picture 34. Another step 108 of method 100 is determining a position of plug housing 14 and a position of contact portion 20 in the taken at least one spatially resolved picture 27. A further step 110 in method 100 is calculating a robot movement necessary for fitting contact portion 20 with plug housing 14 using the respective determined positions of contact portion 20 and the plug housing 14. Another step 112 in method 100 is performing said calculated movement by robot 40 to fit contact portion 20 in to plug housing 14.

Figure 8:
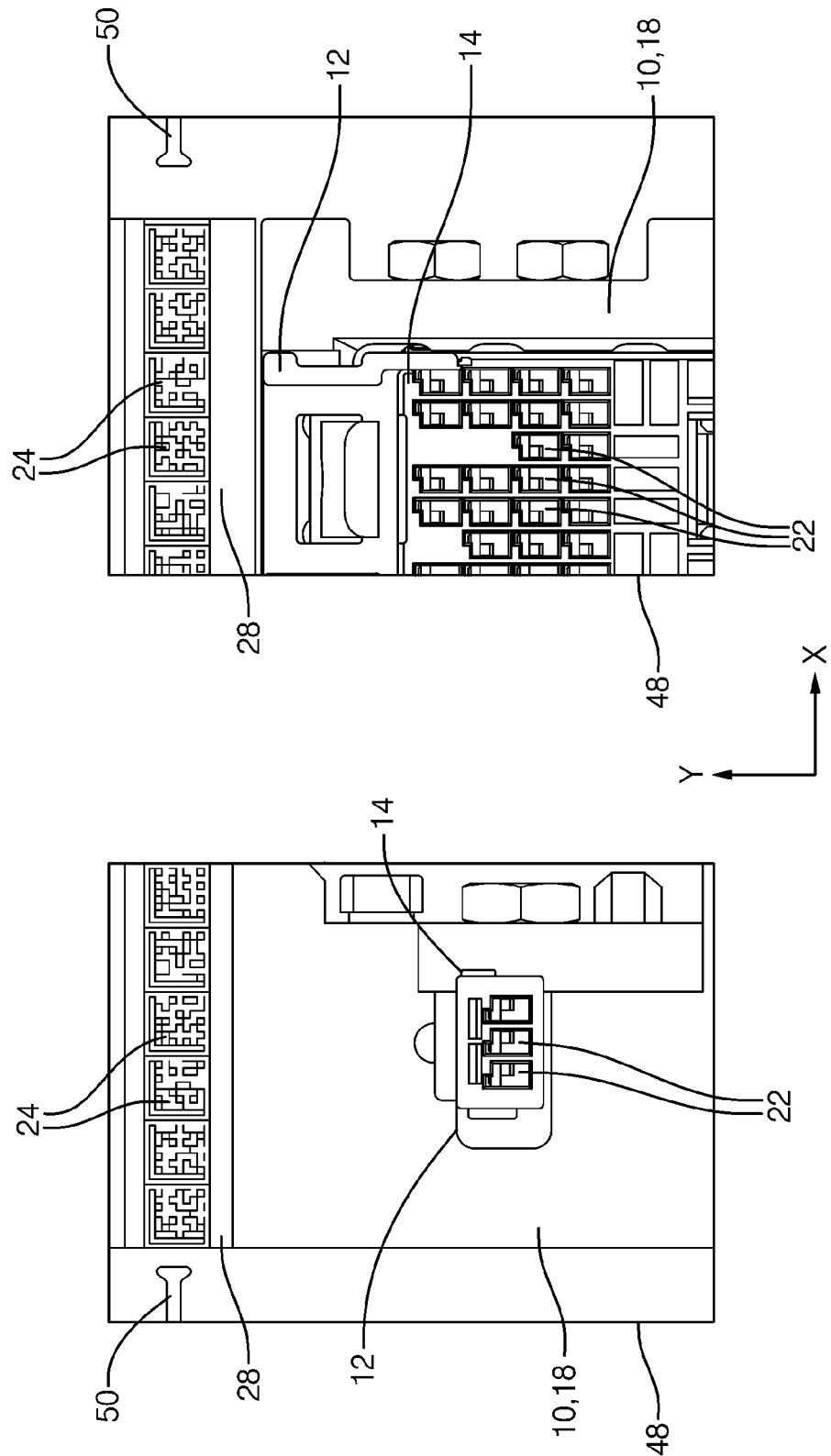
FIGS. 8A and 8B are spatially resolved pictures of a holder of an apparatus taken to carry out a calibration of a moveable robot, according to an alternate embodiment of the invention.
Figure 9:
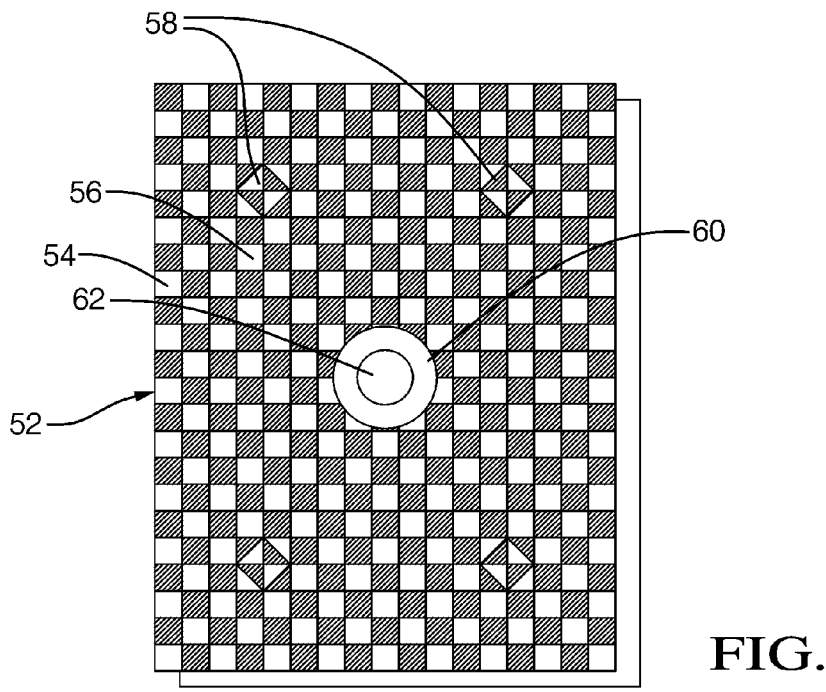
FIG. 9 is a reference object for carrying out the calibration of the moveable robot used in addition to the spatially resolved pictures of FIGS. 8A and 8B.
Figure 10:
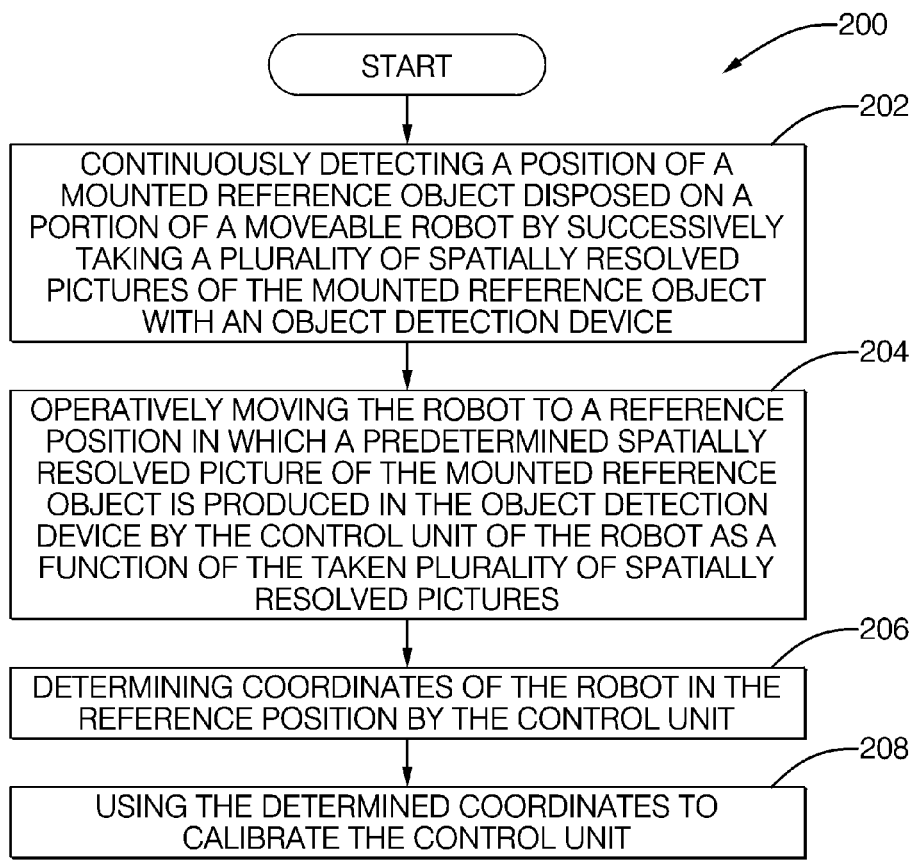
FIG. 10 is a method flowchart to calibrate a control unit associated with the moveable robot which is related with the spatially resolved pictures of FIGS. 8A and 8B and the reference object of FIG. 9.

Referring to FIGS. 8-10, according to an alternate embodiment of the invention a spatially resolved picture 48 is respectively illustrated which is taken with optical detection device 16, 42 as illustrated in FIGS. 1, 2, 4, and 5, by way of example, and which is used for calibration of the holder 10 and reference features 24. The pictures shown in FIGS. 8a and 8b are in this case each taken from a front side 18 of the holder 10, wherein FIG. 8a shows the left side end region of the holder 10 and FIG. 8b shows the right side end region with a plug housing 14 received. Each spatially resolved picture 48 contains a marking 50 of the holder 10, which is visible from both sides 18, 26 of the holder 10 and serves as a reference for calibration of the reference features 24. In each spatially resolved picture 48 the positions of the reference features 24 contained in the respective picture relative to the marking 50 are determined. Similarly, from the rear side 26 of the holder 10 spatially resolved pictures 48, not shown separately in FIG. 8, are taken, which contain the markings 50 and reference features 24 arranged on the rear side 26 of the holder 10. From the positions of the reference features 24 on the front and rear sides 18, 26 in the pictures taken from the front and rear sides 18, 26, relative to the marking 50 contained in the pictures 48 respectively, the positions of the reference features 24 arranged on the front side 18 of the holder 10 relative to the reference features 24 arranged on the rear side 26 are determined. These values are stored as a calibration and used for correction of the positions of the plug housing 14 or contact portion 20 determined with the aid of the reference features 24 present on the front and rear sides 18, 26 respectively. In this way, reliable establishment of the positions is made possible even when the reference features 24 on the front and rear sides 18, 26 are arranged not directly opposite, but for example staggered from each other.

Referring to FIGS. 9 and 10, a reference object 52 is illustrated which is suitable for carrying out a method 200 according to the invention for calibrating a control unit of a movable robot. The reference object 52 comprises a table 54 with a chessboard pattern 56 applied, as well as four reference marks 58 arranged in a rectangle and a vertically projecting pin 60 at the center of the table with a marking point 62. The reference object 52 can be mounted on a robot flange or on a gripping device of the robot. One step 202 in method 200 is when the reference object 52 is mounted, by means of an optical detection device a spatially resolved picture of the reference object 52 is produced continuously. Another step 204 in method 200 is with the aid of the pictures the robot is operatively moved and controlled to place the reference object 52 in a reference position in front of the optical detection device, in which a previously specified picture of the reference object 52 is produced in the optical detection device.

The reference position is reached in the present example when, in the picture taken, the center 62 of the reference object 52 is located in the middle of a rectangle formed from the four reference marks 58. The table 54 is then perpendicular to the optical axis of the optical detection device. A further step 206 in method 200 occurs when in this reference position the internal coordinates of the robot determined by the control unit. Another step 208 in method 200 is when the coordinates are then subsequently used for calibration. By making a reference position measurement as described above with the reference object 52 mounted on a robot flange and with the reference object 52 mounted on a gripping device of the robot, the exact position of a gripping device relative to the robot flange can be determined, enabling extremely precise calibration of a control unit of the robot with a gripping device.

Thus, a method and an apparatus for the fitting of a contact portion mounted to an electrical cable to a plug housing by a movable robot where the robot, plug housings, holders and/or contact portions are subject to manufacturing and part tolerances. The method and apparatus allow precise, error-free, and rapid fitting of the contact portion mounted on an electrical cable to the plug housing. Successive spatially resolved pictures are taken by an optical detection device so that positions of the contact portion and the holder are determined and a robot movement is calculated. The robot movement, once performed by the robot fits the contact portion to the plug housing. A calibration method performed on the control unit of the robot using a mounted reference object on the robot allows for precise calibration of the control unit with a gripping device of the robot.

While this invention has been described in terms of the preferred embodiment thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. A method for the fitting of a plug housing with a contact portion mounted on an electrical cable by a movable robot, the method comprising the steps of:
   attaching the plug housing to a holder;
   gripping one of the electrical cable and the contact portion by a gripping device of the robot;
   taking of at least one spatially resolved picture by at least one optical detection device such that the contact portion and the plug housing are contained in the taken at least one spatially resolved picture;
   determining a position of the plug housing and a position of the contact portion in the at least one spatially resolved picture;
   calculating a robot movement necessary for fitting the contact portion with the plug housing said respective determined positions of the contact portion and the plug housing; and
   performing said calculated movement by the robot to fit the contact portion in to the plug housing.

2. The method according to claim 1, wherein at least one spatially resolved picture includes a first spatially resolved picture and a second spatially resolved picture, and the first spatially resolved picture is taken and contains the plug housing, and the second spatially resolved picture which is different from the first spatially resolved picture is taken, said second spatially resolved picture contains the contact portion, wherein the first and the second spatially resolved pictures are taken by different optical detection devices.

3. The method according to claim 2, wherein the first spatially resolved picture is taken from a front side of the plug housing from which the contact portion is inserted in the plug housing, and the second spatially resolved picture is taken from a rear side of the plug housing.

4. The method according to claim 2, wherein the first spatially resolved picture contains the holder, wherein a position of the plug housing relative to the holder in the first spatially resolved picture is determined, and/or in that the second spatially resolved picture contains the holder, wherein a position of the contact portion relative to the holder in the second spatially resolved picture is determined.

5. The method according to claim 2, wherein at least one spatially resolved picture taken contains the gripping device of the robot, and a position of the gripping device in the at least one spatially resolved picture is determined.

6. The method according to claim 4, wherein a position of the plug housing relative to at least one reference feature of the holder contained in the first spatially resolved picture is determined, and/or in that a position of the contact portion relative to at least one reference feature of the holder contained in the second spatially resolved picture is determined.

7. The method according to claim 6, wherein the position of the plug housing relative to a plurality of reference features of the holder contained in the first spatially resolved picture is determined, and/or in that the position of the contact portion relative to said plurality of reference features of the holder contained in the second spatially resolved picture is determined.

8. The method according to claim 1, further including,
   moving the robot into a vicinity of the holder prior to the step of taking said at least one spatially resolved picture.

* * * * *